Jan. 27, 1953 — M. L. SMALLEGAN — 2,626,724

SECTIONAL WATER TROUGH

Filed July 27, 1950

INVENTOR
MARVIN L. SMALLEGAN
BY
Rice and Rice
ATTORNEYS

Patented Jan. 27, 1953

2,626,724

UNITED STATES PATENT OFFICE 2,626,724

SECTIONAL WATER TROUGH

Marvin L. Smallegan, Zeeland, Mich., assignor to Automatic Poultry Feeder Company, Zeeland, Mich., a corporation of Michigan Application July 27, 1950, Serial No. 176,138

2 Claims. (Cl. 220—4)

1

The present invention relates to sectional water troughs and more particularly to those of the sectional type.

The primary objects of the instant invention are to provide a trough of the general character above indicated which is particularly well adapted for use in a poultry house; to provide such a trough whose several sections may be readily and conveniently secured together; to provide such a trough and the supports therefor which are structurally simple in character; and, to provide such a trough whose several sections and supports for the assembled sections are reasonably economical in manufacture.

An illustrative embodiment of the invention is shown in the accompanying drawing, wherein.

Figure 2:
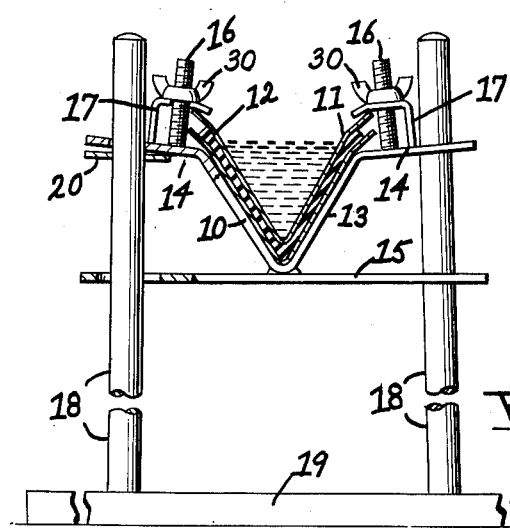
Figure 2 is an enlarged sectional view thereof on line 2—2 of Figure 1.

Referring then to the drawing wherein like parts of the structure shown are designated by the same numerals in the several views, the same comprises a plurality of V-shaped sections 10, 11, the section 10 being an end section and the section 11 being an intermediate section, Figure 2. These sections are assembled in the manner presently to be described and permitting of short or longer lengths of such a trough depending upon the length of the poultry house and the number of chickens, ducks or other fowl that may be ensconced therein.

Figure 1:
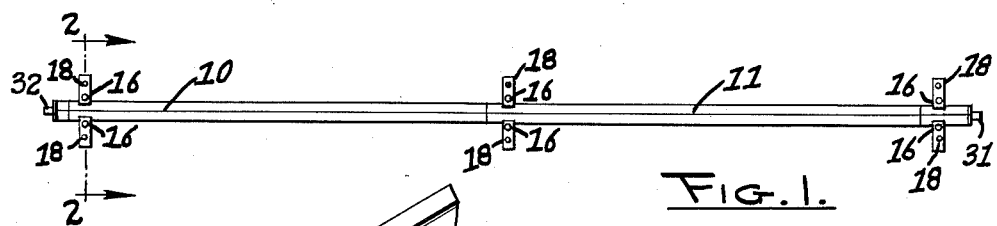
Figure 1 is a top plan view of a plurality of secured sections of an assembled length of the trough.
Figure 3:
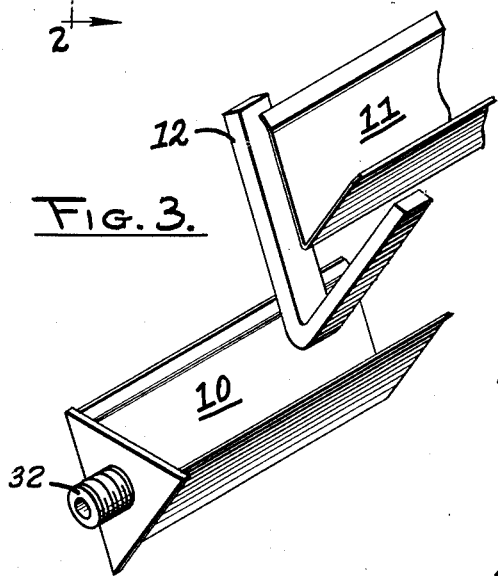
Figure 3 is a fragmentary perspective exploded view of the trough illustrative of the manner in which a pair of sections of the trough are disposed before they are secured together.

A V-shaped gasket 12 of rubber or any other suitable material is adapted to be disposed between overlapping ends of a pair of sections 10, 11 as best indicated in Figure 3. An inlet 13 for admitting water to the end section 10 of the assembled trough is shown and an outlet 14 at the other end is illustrated in Figure 1.

In assembling the several sections of the trough, sections 10, 11 are laid in overlapping end to end relation with the gasket 12 disposed therebetween and in the form shown in Figure 2. A V-shaped bracket 13 provided with integrally formed, apertured, upwardly, angularly disposed arms 14 at its upper end and a member 15, apertured at its opposite ends and positioned

2 parallel to the arms 14 and fixedly secured to the lower end of the bracket 13 forms a support for the assembled sections 10, 11.

Means for securing the several sections together comprise a pair of screw threaded shanks 16, each projecting laterally from an arm 14 of the V-shaped bracket 13 and a generally inverted, L-shaped apertured clip 17 embracing each screw threaded shank 16. The clip 17 has one leg resting upon the arm 14 and the other leg upon the upper end of a trough section 11. The clip 17 is forced against the trough section 11 by a wing nut 30.

A plurality of pairs of spaced, vertically disposed legs 18, each pair being secured at their lower ends to a base member 19, are provided to adjustably support the assembled trough at a pre-selected height above the floor of the poultry house depending upon the age of the fowl. The apertured member 15 slidably embraces a pair of oppositely disposed legs 18. The apertured arms 14 of the V-shaped bracket 13 likewise, but tensionally, embrace a pair of the same legs, one arm 14 preferably being disposed in tensional engagement over a leg embracing washer 20. The washer 20 has a central aperture smaller than the leg receiving aperture in the arm 14. It, therefore, locks against the leg at a different angle than the arm 14 and serves to support the arm 14 on the leg 18, the washer and the arm working against each other to prevent slippage.

Figure 4:
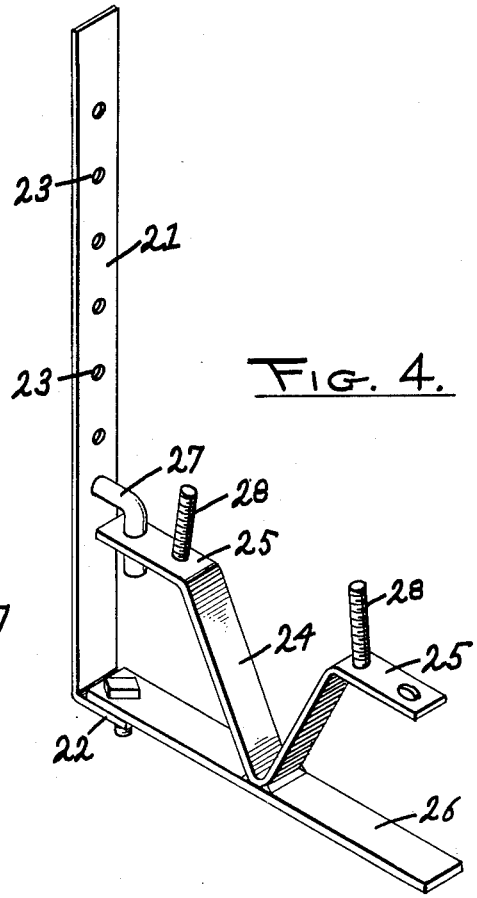
Figure 4 is a modified form of a supporting member of the trough than that shown in Figure 2.

The modified form of the trough supporting bracket shown in Figure 4 comprises an elongated member 21 provided with a laterally disposed foot 22 and a plurality of spaced apertures 23. The member 21 is adapted to be secured to a wall of a poultry house in any suitable manner.

A V-shaped bracket 24 having a pair of laterally disposed apertured arms 25 at its upper end is fixedly secured to a member 26. An L-shaped piece 27 has one leg seated in the apertured arm 25 and its other leg secured to the member 21. The member 21 has a plurality of vertically spaced apertures 23 whereby the member 21 may be mounted to the wall of a poultry house by hanging it on a projecting peg in the poultry house wall. The member 21 is vertically adjustable to meet the requirements of poultry of different ages by seating different apertures 23 over this peg.

The several sections 10, 11 are assembled in the manner heretofore described and are similarly secured to the supporting bracket 24 whose arms 25 are each provided with screw threaded shanks 28, each adapted to receive a wing nut, not shown, for securing the sectional trough therein.

The trough is preferably adjusted at a slight angle in order that water entering the inlet end 32 may flow therefrom at the outlet end 31 to maintain the water in a fresh condition.

It will thus be seen that the water trough herein shown and described is particularly well adapted for use in a poultry house, that the several sections may be readily and conveniently secured together, that the supports therefor are structurally simple in character, and that the same is reasonably economical in manufacture.

While but several specific embodiments of the invention have been herein shown and described, it will be understood that certain details of the constructions shown may be altered or omitted without departing from the spirit of the invention as the same is defined in the following claims.

I claim:

1. In a sectional trough, the combination comprising: a plurality of V-shaped trough sections, said trough sections being arranged with their ends in overlapping relationship; a gasket between said overlapping ends; a V-shaped bracket having upwardly, angularly disposed, apertured arms; a pair of spaced posts; said arms being adapted to slidably and tensionally embrace said posts; a threaded stud on each arm of said V-shaped bracket; a pair of L-shaped clips, each engaging one of said studs; one leg of each of said clips engaging said arm of said V-shaped bracket; the other leg of each of said clips engaging the upper portion of the upper of said trough sections; means for urging each of said clips firmly against said arms and said trough sections.

2. In a sectional trough having a plurality of V-shaped trough sections, said trough sections being arranged in overlapping relationship with a gasket between said overlapping ends, the improvement comprising: a V-shaped bracket having upwardly angularly disposed apertured arms; a pair of posts, each received through one of said apertured arms for slidable and tensional embrace by said arms; a threaded stud on each arm of said V-shaped bracket; a pair of clips; each of said clips receiving one of said studs therethrough; one end of each of said clips engaged in the upper of said overlapping trough sections; means on each of said studs for urging said clips against said trough section for compressing said gasket.

MARVIN L. SMALLEGAN.

REFERENCES CITED

The following references are of record in the file of this patent:

UNITED STATES PATENTS

| Number | Name | Date |
| --- | --- | --- |
| 232,026 | Hayward | Sept. 7, 1880 |
| 341,211 | Beazley | May 4, 1886 |
| 512,109 | Hinman | Jan. 2, 1894 |
| 700,522 | Maginnis | May 20, 1902 |
| 1,896,096 | Parker | Feb. 7, 1933 |
| 1,996,690 | Schlegel | Apr. 2, 1935 |
| 2,154,345 | Miller | Apr. 11, 1939 |
| 2,525,654 | De Ville | Oct. 10, 1950 |